Patented June 8, 1937

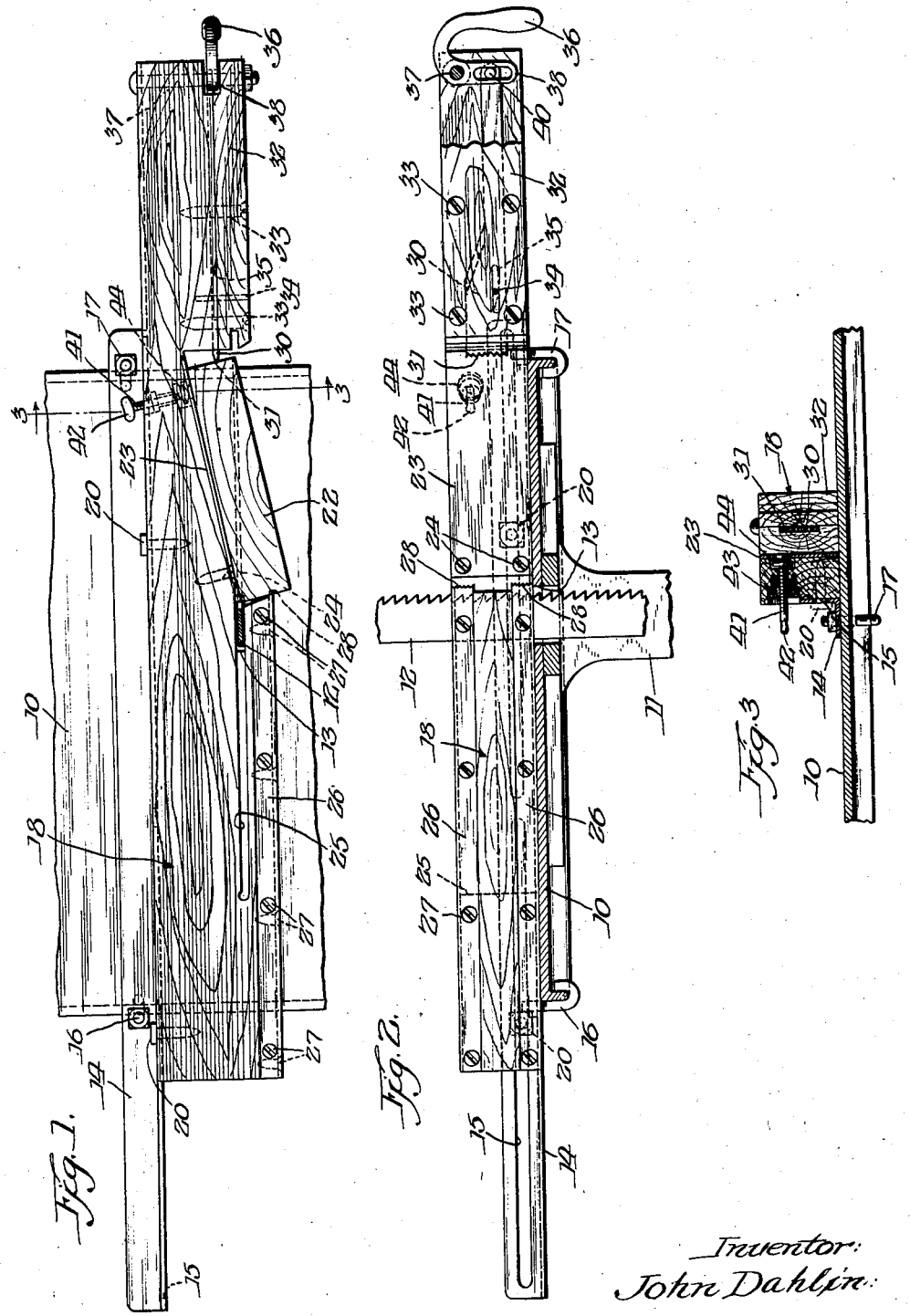

2,083,435

UNITED STATES PATENT OFFICE 2,083,435

SAFETY WEDGE CUTTER

John Dahlin, Virginia, Minn.

Application June 22, 1935, Serial No. 28,011

3 Claims. (Cl. 143—5)

The invention relates to improvements in apparatus for severing blocks of wood to form wedges and has for an object to provide apparatus of improved design which will operate safely at a relatively rapid rate that can be continued for a long period of time, resulting in a greater output than has heretofore been possible with equipment of identical cost.

With these and various other objects in view the invention may consist of certain novel features of construction and operation as will be more fully described and particularly pointed out in the specification, drawing and claims appended hereto.

In the drawing which illustrates an embodiment of the invention and wherein like reference characters are used to designate like parts—

Figure 1 is a plan view of a safety wedge cutter constructed in accordance with the invention;

Figure 2 is an elevational view of the device; and

Figure 3 is a transverse sectional view taken substantially along line 3—3 of Figure 1.

The apparatus of the invention is designed for association with a table 10 of any conventional type supported by standard 11 and which is equipped with a band saw designated by numeral 12. The mechanism for operating the band saw is not shown as the same does not comprise any part of the invention but to properly appreciate the present device it should be understood that the saw 12 is in the form of an endless belt which is supported so as to pass vertically through the opening 13 in the table.

The angle strip 14 having the longitudinal slots 15 formed in the upstanding flange is removably secured to the top surface of the table 10 by the hook bolts 16 which hook under the depending edge of the table and project through openings in the base of the angle strip 14, the upwardly projecting ends of the bolts receiving the nuts 17 which firmly secure the angle strip to the table. The carriage 18 for holding the blocks of wood to be cut into wedges is fastened to the upstanding flange of the angle strip 14 by means of the headed screws 20 which ride within the slots 15, permitting reciprocating movement of the carriage on the table within the limits of the slots. The side of the carriage opposite its securement to the angle strip is provided with a recess or cut-out portion for receiving the block of wood 22 to be severed into wedges. The recess has a diagonal wall surfaced by a metal plate 23 held in place by screws 24. One end of the recess communicates with a slot 25 which is adapted to receive the band saw 12 and the side of the carriage adjacent this slot is provided with upper and lower angles 26 secured to the same by screws 27. The right hand ends of the angles extend into the recess and are notched as shown at 28 for contacting with the end of the block of wood 22. At the opposite end of the recess the carriage is provided with a clamp in the form of a flat metal strip 30, one end of which is supported to extend within the recess, being notched at 31 for contacting and holding the block of wood 22. The clamp is mounted for reciprocating movement, being confined between the carriage and the cover plate 32 secured to said end of the same by screws 33. The pin 34 rides within the slot 35 in the clamp and serves to maintain the same in proper position during reciprocating movement.

The extreme right hand end of the carriage is provided with a handle 36 by which the operator imparts reciprocating movement to the carriage. This handle is additionally used to actuate the clamp 30 and is accordingly pivoted to the bolt 37 extending transversely through the right hand end of the carriage. A portion 38, preferably integral with the handle, extends within a recess provided in the carriage and has a loose connection as at 40 with the end of the clamp 30. Pivotal movement of the handle will effect recpirocation of the clamp to thus hold the block 22 within the recess or to release the block as the case may be.

Proper positioning of the wood block 22 within the recess is determined by the angularity of the plate 23. The invention therefore provides means for adjusting the position of this plate consisting of a threaded bolt 41 having the winged portion 42 and which is threaded in plate 43 suitably secured to the carriage. The winged portion extends beyond the side of the carriage and is accessible to the operator for rotating the bolt 41, the other end of the bolt having contact with the member 44 forming part of the plate 23. Therefore, it will be seen that rotation of the screw 41 in one direction will move the plate outwardly into the recess, while rotation in the opposite direction will allow the plate to assume a position where it will lie flat against the diagonal wall of the recess.

In the operation of the device the carriage is first drawn toward the operator, that is, in a direction toward the right, which locates the band saw 12 within the slot 25. The block of wood is then inserted within the recess firmly against the plate 23 and handle 36 is pressed downwardly, reciprocating the clamp 30 and forcing its notched end into contact with the block which also results in forcing the block into contact with the notched ends 28 of the angles 26. Thus the block of wood is firmly held within the recess and the carriage is now ready to be reciprocated toward the left. This is accomplished by the operator who has a grip on the handle 36. It will be seen that any pressure on the handle 36 to force the carriage to the left will also tend to force the clamp 30 into contact with the block 22. Therefore, during severing of the block the same is firmly and securely held within the recess. When the carriage has reached its extreme left hand position, completing the operation of severing the block diagonally as shown in Figure 1, the direction of movement of the carriage is reversed and the same is returned to its initial position. Drawing the carriage toward the operator will cause oscillation of handle 36 in a direction to withdraw the clamp 30 from contact with the block, and therefore the block is automatically released by return movement of the carriage.

The apparatus of the invention has been particularly designed to diagonally cut rectangular blocks of wood to form wedges and the present apparatus makes possible the use of an ordinary band saw as the device can be readily attached to the saw table without alteration. It is likewise possible to use the apparatus in conjunction with a circular saw as the cutting portion of a circular saw projects a small distance above the table and thus the slot 25 formed in the carriage would accommodate this cutting portion. The block of wood to be cut is firmly and securely held within a recess during the sawing operation and is automatically released by return movement of the carriage to permit the cut pieces to drop from the table.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. In a device of the character described, the combination of a cutting element in the form of a saw, with a carriage supported for movement and adapted to be reciprocated with respect to the cutting element, said carriage having a recess in the path of the cutting element for receiving a work piece to be cut by said element, means associated with the recess for adjusting the position of the work piece, and means provided by the carriage for firmly holding the work piece during the cutting operation, said means including members fixed to the carriage and a clamp supported for movement by the carriage in directions toward and away from the work piece.

2. In a device of the character described, the combination of a cutting element in the form of a saw, with a carriage supported for reciprocating movement with respect to the cutting element, said carriage having a recess in the path of the cutting element for receiving a work piece to be cut by said element, members fixed to the carriage and projecting into the recess for contacting one end of the work piece, a movable clamp supported by the carriage and adapted to extend into the recess for engaging the other end of the work piece, and a lever pivoted to one end of the carriage and connecting with said clamp whereby pivotal movement of said lever effects reciprocating movement of the clamp in directions toward and away from the work piece.

3. In a device of the character described, the combination of a cutting element in the form of a saw, with a carriage supported for reciprocating movement with respect to the cutting element, said carriage having a recess in the path of the cutting element for receiving the work piece to be cut by said element, a slot communicating with the recess for receiving the saw, means associated with the recess for adjusting the position of the work piece, members fixed to the carriage and extending within the recess for contacting one end of the work piece, a movable clamp supported by the carriage and extending within the recess for contacting the opposite end of the work piece, and a lever pivoted to one end of said carriage for effecting reciprocating movement of the carriage, said lever having connection with the clamp whereby pivotal movement of the lever imparts reciprocating movement to the clamp in directions toward and away from the work piece.

JOHN DAHLIN.

CERTIFICATE OF CORRECTION.

Patent No. 2,083,435.  June 8, 1937.

JOHN DAHLIN.

It is hereby certified that error appears in the printed specification of the above numbered patent requiring correction as follows: Page 2, second column, lines 1, 15 (first occurrence) and 31, claims 1, 2 and 3 respectively, for "of" read with; and lines 2, 16 and 32, same claims, for "with" read of; and that the said Letters Patent should be read with these corrections therein that the same may conform to the record of the case in the Patent Office.

Signed and sealed this 14th day of September, A. D. 1937.

Henry Van Arsdale

Acting Commissioner of Patents.

(Seal)